US011948487B2

(12) United States Patent
Kim et al.

(10) Patent No.: US 11,948,487 B2
(45) Date of Patent: Apr. 2, 2024

(54) CURRENT SUPPLY CIRCUIT AND DISPLAY DEVICE INCLUDING THE SAME

(71) Applicant: LX Semicon Co., Ltd., Daejeon (KR)

(72) Inventors: Ji Hwan Kim, Daejeon (KR); Sang Suk Kim, Daejeon (KR); Jang Su Kim, Daejeon (KR)

(73) Assignee: LX SEMICON CO., LTD., Daejeon (KR)

(*) Notice: Subject to any disclaimer, the term of this patent is extended or adjusted under 35 U.S.C. 154(b) by 0 days.

(21) Appl. No.: 17/941,887

(22) Filed: Sep. 9, 2022

(65) Prior Publication Data

US 2023/0083076 A1 Mar. 16, 2023

(30) Foreign Application Priority Data

Sep. 16, 2021 (KR) ........................ 10-2021-0123621

(51) Int. Cl.
*G09G 3/3241* (2016.01)
*G09G 3/20* (2006.01)
*G09G 3/3283* (2016.01)
*G09G 3/32* (2016.01)

(52) U.S. Cl.
CPC ................. *G09G 3/20* (2013.01); *G09G 3/32* (2013.01); *G09G 3/3241* (2013.01); *G09G 3/3283* (2013.01); *G09G 2300/0809* (2013.01); *G09G 2300/0842* (2013.01); *G09G 2310/0272* (2013.01); *G09G 2320/0214* (2013.01); *G09G 2320/0233* (2013.01); *G09G 2320/0626* (2013.01); *G09G 2330/021* (2013.01)

(58) Field of Classification Search
CPC ............. G09G 3/20; G09G 2300/0842; G09G 2320/0626; G09G 2330/021; G09G 3/2011; G09G 2300/06; G09G 2300/0809; G09G 3/32; G09G 2310/0272; G09G 2320/0214; G09G 3/3241; G09G 3/3283; G09G 3/3291; G09G 2320/0233
See application file for complete search history.

(56) References Cited

U.S. PATENT DOCUMENTS

| | | | | |
|---|---|---|---|---|
| 2016/0379565 A1* | 12/2016 | Nathan | .................. | H05B 45/60 345/690 |
| 2017/0025065 A1* | 1/2017 | Nathan | ................ | G09G 3/3696 |
| 2020/0135103 A1* | 4/2020 | Takahara | ............. | G09G 3/2003 |

FOREIGN PATENT DOCUMENTS

| | | |
|---|---|---|
| KR | 2020-0048967 A | 5/2020 |

* cited by examiner

*Primary Examiner* — Douglas M Wilson
(74) *Attorney, Agent, or Firm* — ROTHWELL, FIGG, ERNST & MANBECK, P.C.

(57) ABSTRACT

The present disclosure provides a current mirror circuit including a first transistor configured to be supplied with a data current from a data driving circuit; a second transistor configured to drive a light emitting diode by mirroring the data current transferred to the first transistor; a capacitor disposed between the first transistor and the second transistor and configured to store a voltage of a gate terminal of the second transistor therein; and a first switch disposed between the first transistor and the second transistor and configured to adjust an input current of the gate terminal of the second transistor.

19 Claims, 12 Drawing Sheets

CURRENT SUPPLY CIRCUIT AND DISPLAY DEVICE INCLUDING THE SAME

CROSS REFERENCE TO RELATED APPLICATION

This application claims priority to Republic of Korea Patent Application No. 10-2021-0123621 filed on Sep. 16, 2021, which is hereby incorporated by reference in its entirety.

BACKGROUND

1. Field of Technology

The present disclosure relates to a current supply circuit and a display device including the same.

2. Related Technology

A display device includes a data driving circuit, a gate driving circuit, and so forth for driving pixels disposed in a panel.

The data driving circuit determines a data voltage or a data current according to image data, and supplies the data voltage or the data current to a pixel of the panel through a data line to control the brightness of the pixel.

Even though the same data voltage is supplied from the data driving circuit, the brightness of each pixel may vary depending on the characteristics of each pixel or an external environment. For example, each pixel includes a driving transistor. If the threshold voltage of the driving transistor varies, the brightness of the pixel may vary even though the same data voltage is supplied. If the data driving circuit does not consider such variations in the characteristics of the pixels, problems may be caused in that the pixels are driven to undesired brightness and image quality deteriorates.

In addition, even though the same data voltage is supplied from the data driving circuit, if a current leaks from the driving transistor of the pixel or a leakage current of a switch transistor is supplied to the driving transistor of the pixel, the brightness of the pixel may vary. For example, in order to prevent the deterioration of image quality, a separate component for reducing the voltage change of the driving transistor, for example, a capacitor, may be additionally included. However, even in this case, since a current path is formed between the capacitor and transistors around the pixel to leak a current, a problem is caused in that the desired brightness of the pixels is not realized.

The discussions in this section is only to provide background information and does not constitute an admission of prior art.

SUMMARY

Under such a background, various embodiments are to provide a current supply circuit capable of preventing the voltage of a capacitor from being changed due to a leakage current between a transistor and a capacitor in a display device, thereby preventing deterioration of image quality of the display device.

Also, various embodiments are to provide a current supply circuit which maintains the same the voltages of a body terminal and a source terminal or a drain terminal of a transistor connected to a capacitor, thereby minimizing the leakage of a current generated at the body terminal of the transistor.

Further, various embodiments are to provide a current supply circuit in which a plurality of switches are disposed in a path extending from a data driving circuit to a pixel and the operations of the respective switches are correlated to be capable of electrically disconnecting each component of a current mirror circuit depending on a time period.

In one aspect, an embodiment may provide a current mirror circuit including: a first transistor configured to be supplied with a data current from a data driving circuit; a second transistor configured to drive a light emitting diode by mirroring the data current transferred to the first transistor; a capacitor disposed between the first transistor and the second transistor, and configured to store a voltage of a gate terminal of the second transistor therein; and a first switch disposed between the first transistor and the second transistor, and configured to adjust an input current of the gate terminal of the second transistor.

In another aspect, an embodiment may provide a current supply circuit including: a first transistor configured to be supplied with a data driving current through a data line; a second transistor configured to supply a pixel current to a light emitting diode in response to the data driving current of the first transistor; and a current compensation circuit connected to the first transistor and the second transistor, and configured to adjust a current transferred to the second transistor, wherein the current compensation circuit adjusts a current between the first transistor and the second transistor through at least one switch transistor.

In still another aspect, an embodiment may provide a current supply circuit including: a first transistor selectively supplied with a data driving current by using a data current cutoff switch through a data line; a second transistor configured to supply a current having a magnitude corresponding to that of the data driving current transferred to the first transistor, to a light emitting diode; and a voltage compensation circuit connected to one end of the first transistor and one end of the second transistor and configured to compensate for a voltage of a gate terminal of the second transistor, wherein an operation of the voltage compensation circuit is changed in response to an operating timing of the data current cutoff switch.

As is apparent from the above, according to the embodiments, a change in the voltage of a capacitor due to a leakage current between a transistor and the capacitor of a pixel in a display device may be minimized, and due to this fact, it is possible to prevent the deterioration of image quality due to a change in the characteristics of the pixel.

Also, according to the embodiments, since a change in the voltage of a driving transistor of a pixel may be prevented by preventing the leakage of a current generated at a body terminal of a switch transistor of the pixel, it is possible to control the pixel to a desired brightness.

Further, according to the embodiments, since the operations of a plurality of transistors of a pixel may be correlated to electrically disconnect or connect an internal circuit, unnecessary power consumption may be prevented, and power efficiency during the operation process of a panel may be improved.

DETAILED DESCRIPTION OF EMBODIMENTS

Figure 1:
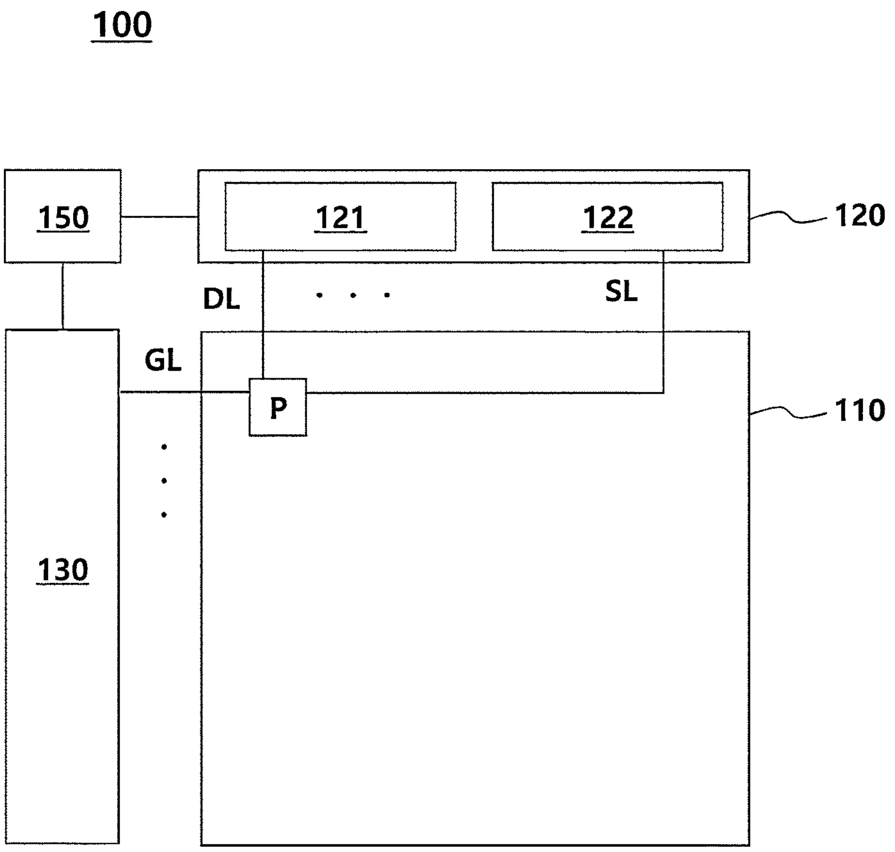
FIG. 1 is a diagram illustrating the configuration of a display device in accordance with an embodiment of the present disclosure.

FIG. 1 is a diagram illustrating the configuration of a display device in accordance with an embodiment of the present disclosure.

Referring to FIG. 1, a display device 100 may include a panel 110, a data driving circuit 120, a gate driving circuit 130, a data processing circuit 150, and so forth.

In the panel 110, a plurality of data lines DL, a plurality of gate lines GL and a plurality of sensing lines SL may be disposed, and a plurality of pixels P may be disposed.

The panel 110 may be a panel in which one or more of a display panel (not illustrated) and a touch panel (not illustrated) are formed separately or integrally. As the panel 110, various panels such as a liquid crystal display (LCD), an organic light emitting diode (OLED), a light emitting diode (LED) and a mini-LED may be used without a limiting sense.

Each of the pixels P disposed in the panel 110 may include at least one light emitting diode (LED) and at least one transistor. The characteristics of the LED and the transistor included in each pixel P may vary over time or depending on a surrounding environment. Each pixel P may be controlled in an active matrix (AM) scheme, and if necessary, may be controlled in a passive matrix (PM) scheme.

The data driving circuit 120 may supply a data voltage to the pixel P through the data line DL. The data voltage supplied to the data line DL may be transferred to the pixel P connected to the data line DL according to a scan signal of the gate driving circuit 130. If necessary, the data driving circuit 120 may be defined as a source driver.

The data driving circuit 120 may include a data signal transmission circuit 121 and a pixel sensing circuit 122.

The data signal transmission circuit 121 may transfer an analog signal to the pixel P in the form of a voltage or a current.

The data signal transmission circuit 121 may include a voltage/current converter (not illustrated), and may supply a data voltage or a data current to the light emitting diode (LED) of the pixel P.

The pixel sensing circuit 122 may receive an analog signal (e.g., a voltage, a current, etc.), formed in each pixel P, through the sensing line SL, and may determine the characteristics of the pixel P. The pixel sensing circuit 122 may sense a change in the characteristics of each pixel P according to time, and may transmit a signal to the data processing circuit 150.

The pixel sensing circuit 122 may include an analog front end (AFE), a sample and hold (S/H), an amplifier (AMP) and an analog-to-digital converter (ADC).

The analog front end (not illustrated) may sense the pixel P, and may process a current transferred from the pixel P to form a sensing voltage Vi.

The sample and hold (not illustrated) may signally separate the analog front end and the amplifier, may temporarily store the sensing voltage (Vi) outputted from the analog front end, and then, may input the sensing voltage (Vi) or a difference (ΔVi) between the sensing voltage (Vi) and a reference voltage to the amplifier.

The amplifier (not illustrated) may amplify the sensing voltage (Vi) or the difference (ΔVi) between the sensing voltage (Vi) and the reference voltage transferred to the input terminal thereof, and may transfer the amplified sensing voltage (Vi) or the amplified difference (ΔVi) to the analog-to-digital converter.

The analog-to-digital converter (not illustrated) may convert the output voltage of the amplifier into a digital signal (Ao).

The gate driving circuit 130 may supply a scan signal of a turn-on voltage or a turn-off voltage to the gate line GL. When the scan signal of the turn-on voltage is supplied to the pixel P, the corresponding pixel P is connected to the data line DL, and when the scan signal of the turn-off voltage is supplied to the pixel P, the connection between the corresponding pixel P and the data line DL is released. If necessary, the gate driving circuit 130 may be defined as a gate driver. The scan signal of the gate driving circuit 130 may define the turn-on timing or turn-off timing of the transistor of the pixel P.

The data processing circuit 150 may supply various control signals to the data driving circuit 120 and the gate driving circuit 130. The data processing circuit 150 may transmit a data control signal (DCS) which controls the data driving circuit 120 to supply a data voltage to each pixel P or transmit a gate control signal (GCS) to the gate driving circuit 130, in conformity with each timing. If necessary, the data processing circuit 150 may be defined as a timing controller (T-Con).

The data processing circuit 150 may output image data RGB converted from externally inputted image data in conformity with a data signal format used in the data driving circuit 120 to transfer the image data RGB to the data driving circuit 120.

Figure 2:
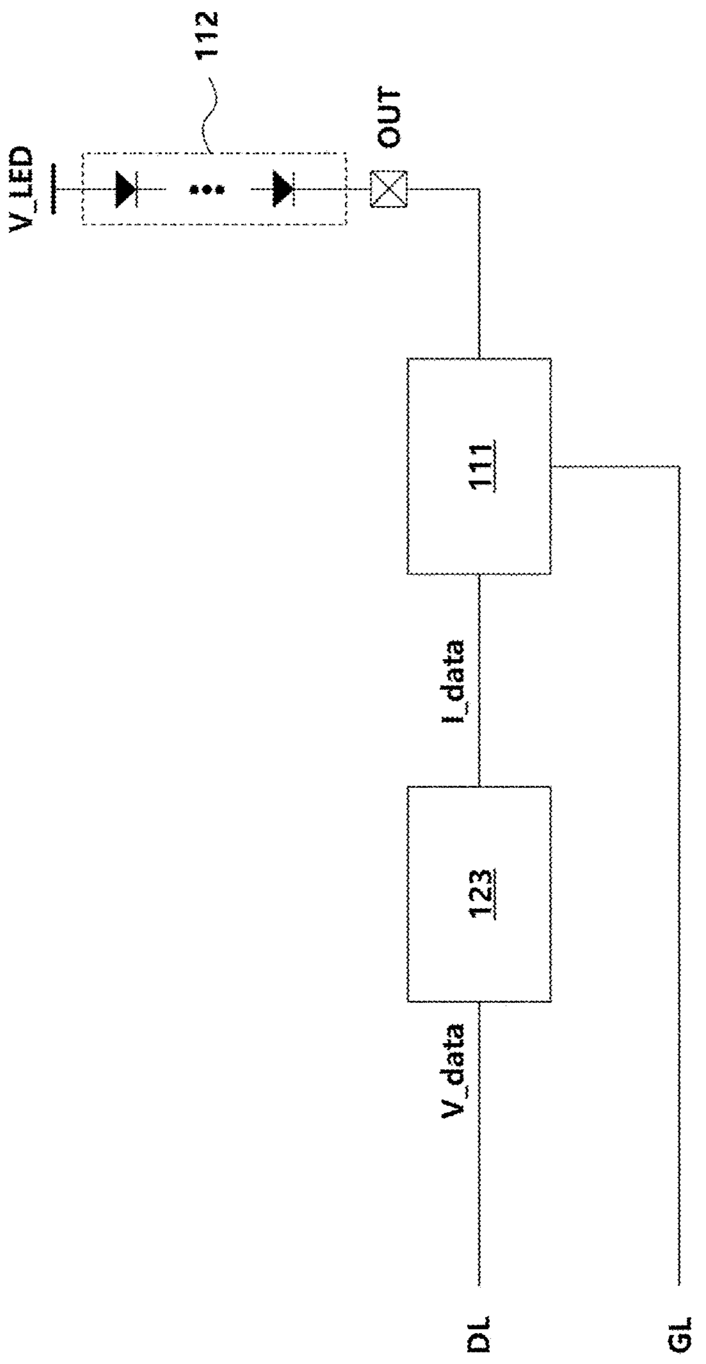
FIG. 2 is a diagram illustrating a signal flow of a current supply circuit in accordance with an embodiment of the present disclosure.

FIG. 2 is a diagram illustrating a signal flow of a current supply circuit in accordance with an embodiment of the present disclosure.

Figure 3:
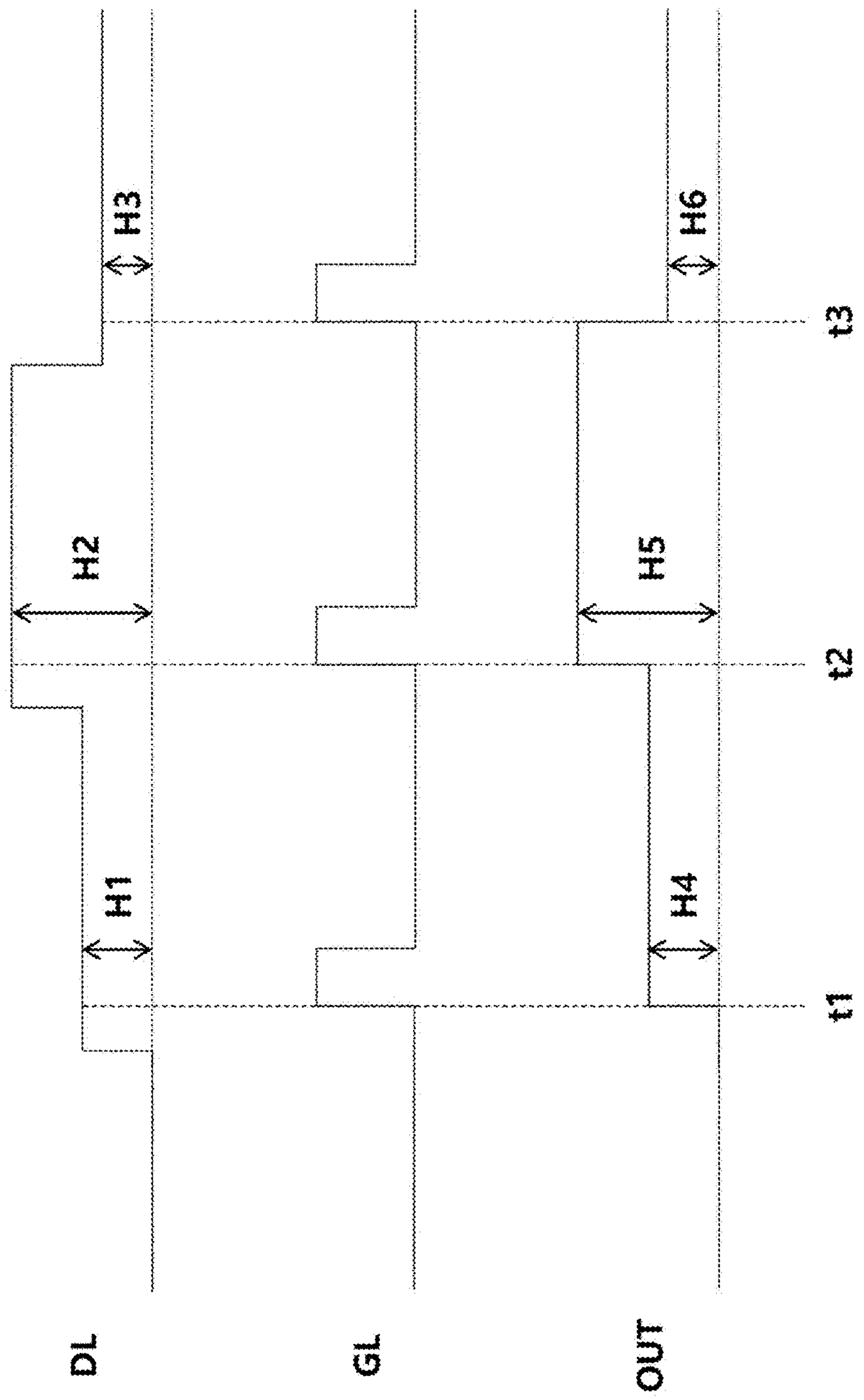
FIG. 3 is a diagram illustrating signal timing of the current supply circuit in accordance with the embodiment of the present disclosure.

FIG. 3 is a diagram illustrating signal timing of the current supply circuit in accordance with the embodiment of the present disclosure.

Referring to FIGS. 2 and 3, the signal flow of a current supply circuit 111 may be defined by a data voltage V_data transferred through a data line DL and a scan signal transferred through a gate line GL.

The current supply circuit 111 may receive the data voltage V_data from the data driving circuit 120 (see FIG. 1) or may receive a data current I_data which is converted by a voltage/current converter 123.

The voltage/current converter 123 may be omitted depending on the type of an analog signal transferred from the data driving circuit 120. For example, when the signal transferred from the data driving circuit 120 is the data current I_data, the voltage/current converter 123 may be omitted, and the data current I_data may be directly transferred to the current supply circuit 111.

The current supply circuit 111 may receive the scan signal from the gate driving circuit 130 (see FIG. 1), and may transfer a corresponding output voltage or output current to a light emitting diode 112 at corresponding timing.

The output voltage or output current of the current supply circuit 111 may correspond to the magnitude of the data voltage V_data or the data current I_data. For example, the current supply circuit 111 may be a current mirror circuit (not illustrated), and in this case, may transfer a voltage or a current the same as the magnitude of the data voltage V_data or the data current I_data to the light emitting diode 112.

The magnitude of the current transferred to the light emitting diode 112 may be defined according to the voltage of an output end OUT of the current supply circuit 111 and a voltage V_LED of one end of the light emitting diode 112. Also, the magnitude of the current transferred to the light emitting diode 112 may be defined according to the state of a transistor which is connected to the output end OUT of the current supply circuit 111.

Referring to FIG. 3, timing of an input signal and an output signal of the current supply circuit 111 may be compared.

The data voltage V_data or the data current I_data may be supplied to the current supply circuit 111 through the data line DL, and the scan signal may be supplied through the gate line GL.

The signal of the output end OUT of the current supply circuit 111 may be generated as an output voltage in response to pulse timing t1, t2 and t3 of the scan signal of the gate line GL.

The signal of the output end OUT of the current supply circuit 111 may be a signal which is outputted by mirroring the data voltage V_data or the data current I_data transferred to the data line DL. In this case, the current supply circuit 111 may be a current mirror circuit in which a plurality of transistors are coupled, but is not limited thereto. In the current mirror circuit (not illustrated), the terminal of one transistor may form a common node.

Magnitudes H4, H5 and H6 of the signals of the output end OUT of the current supply circuit 111 may be the same as magnitudes H1, H2 and H3 of the data voltage V_data or the data current I_data. Otherwise, they may be defined to have a preset correlation or to have a signal magnitude ratio of multiple times.

The input signal and output signal of the current supply circuit 111 exemplify the magnitude and waveform of each signal, and are not limited to FIG. 3.

Figure 4:
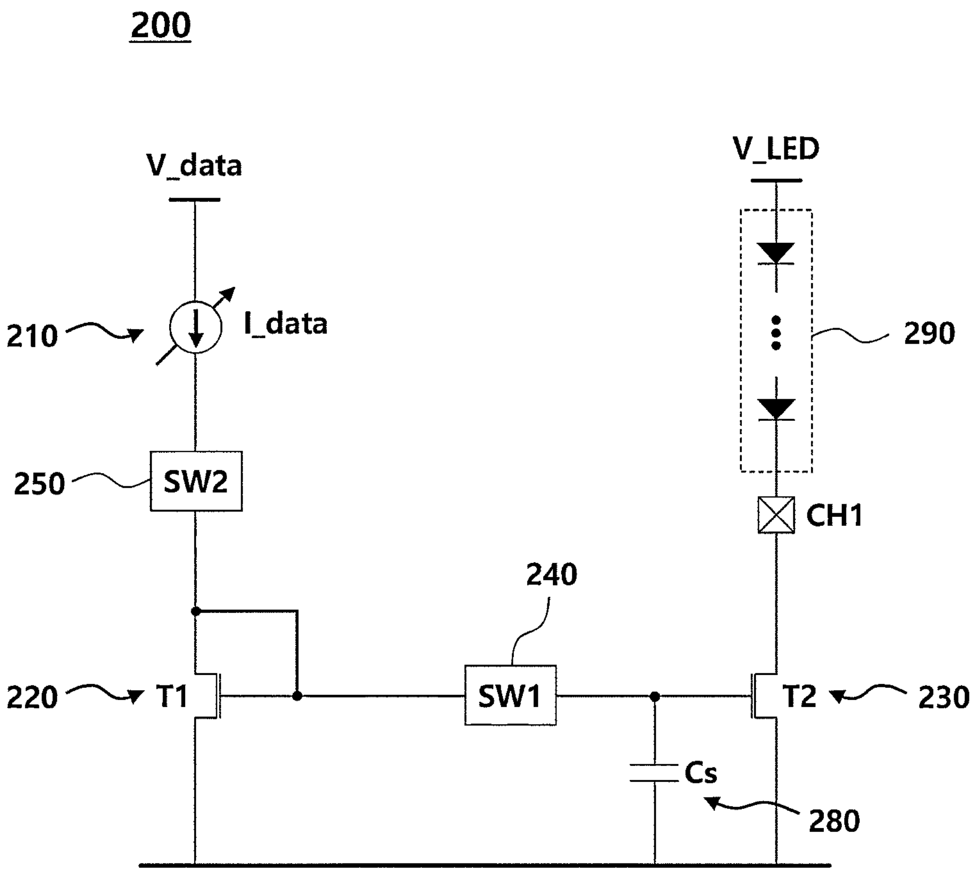
FIG. 4 is a first exemplary diagram illustrating a current supply circuit in accordance with an embodiment of the present disclosure.

FIG. 4 is a first exemplary diagram illustrating a current supply circuit in accordance with an embodiment of the present disclosure.

Referring to FIG. 4, a current supply circuit 200 may include a first transistor 220, a second transistor 230, a first switch 240, a second switch 250, a capacitor 280, and so forth.

The first transistor 220 may be supplied with a data voltage V_data or a data current I_data from a data driving circuit (not shown) through a data line DL.

A voltage/current converter 210 may be disposed between the data driving circuit (not shown) and the first transistor 220 to convert the data voltage V_data into the data current I_data. However, when the type of the signal transferred from the data driving circuit (not shown) is the data current I_data, the voltage/current converter 210 may be omitted.

The second transistor 230 may receive a signal transferred from the first transistor 220 and supply a current to a light emitting diode 290. The light emitting diode 290 may be an individual element, but may be a plurality of elements which are configured as one channel CH1.

The second transistor 230 may mirror the data current I_data transferred to the first transistor 220 and transfer the data current I_data to the light emitting diode 290. A circuit including the first transistor 220 and the second transistor 230 may be defined as a current mirror circuit (not shown).

The first switch 240 may be disposed between the first transistor 220 and the second transistor 230, and may adjust the input current or the input voltage of a gate terminal of the second transistor 230. The first switch 240 may be a switch which cuts off or passes a current by short-circuiting or opening a signal line, and may be a switch transistor which adjusts the intensity of a current.

The entire or partial configuration of the first switch 240 may be defined as a current compensation circuit (not shown) for compensating for a leakage current occurring in the second transistor 230 or a voltage compensation circuit (not illustrated) for compensating for a voltage variation occurring in the gate terminal of the second transistor 230.

The second switch 250 may be disposed between the data driving circuit (not shown) and the first transistor 220, and may adjust a current passing through the data line DL. The second switch 250 may be a switch which cuts off or passes a current by short-circuiting or opening a signal line, and may be a switch transistor which adjusts the intensity of a current.

The output node of the second switch 250 may form a common node to which a terminal of the first transistor 220 is connected, and may form a current mirror circuit. In this case, it is possible to control the current or voltage of the common node in response to the operation of the second switch 250.

The entire or partial configuration of the second switch 250 may be defined as a data current cutoff switch (not shown) for cutting off a data current.

Operations of entire or partial configurations of the first switch 240 and the second switch 250 may be performed by being correlated with each other. The operations of the first switch 240 and the second switch 250 may be performed by being correlated with each other such that the second switch 250 is turned off during a turn-off period of the first switch 240 or is turned on during a turn-on period of the first switch 240.

The capacitor 280 may be disposed between the first transistor 220 and the second transistor 230 to store the voltage of the gate terminal of the second transistor 230. Since the voltage of the gate terminal of the second transistor 230 to which the capacitor 280 is not connected sensitively reacts to an external change such as in an external situation and the state of a pixel, the capacitor 280 may realize a stable pixel operation by storing the voltage of the gate terminal of the second transistor 230.

The charging voltage of the capacitor 280 may be adjusted according to the operation of the first switch 220 or the second switch 230, and may maintain the same voltage during a preset time period.

In order to prevent a leakage current occurring in the capacitor 280, the first switch 240 existing at a position adjacent to the capacitor 280 may be changed in the terminal connection relationship of a transistor or the disposition of a transistor.

Optional one ends of the first transistor 220, the second transistor 230 and the capacitor 280 may be supplied with the same voltage, for example, a ground voltage, but are not limited thereto. In this case, as the one ends of the respective circuits 220, 230 and 280 are supplied with the same voltage, a reference point for signal transfer may be set.

The data voltage V_data may be a power supply voltage Vcc which is supplied to the current supply circuit 200.

Figure 5:
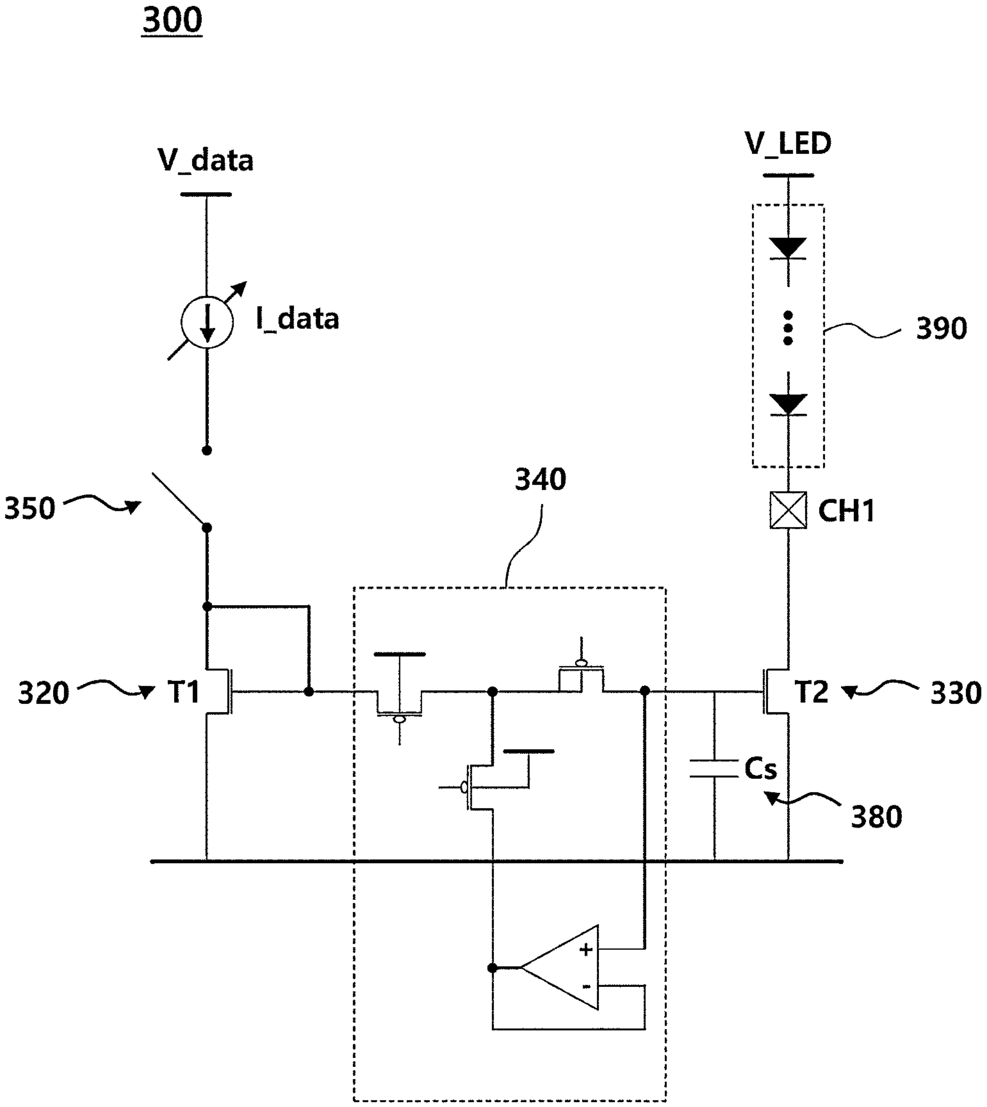
FIG. 5 is a second exemplary diagram illustrating a current supply circuit in accordance with an embodiment of the present disclosure.

FIG. 5 is a second exemplary diagram illustrating a current supply circuit in accordance with an embodiment of the present disclosure.

Referring to FIG. 5, a current supply circuit 300 may include a first transistor 320, a second transistor 330, a current compensation circuit 340, a data current cutoff switch 350, a capacitor 380, and so forth, and may realize the same or similar function as or to the current supply circuit 200 of FIG. 4 described above.

The second transistor 330 may supply a current of a magnitude corresponding to a data current I_data transferred to the first transistor 320, to a light emitting diode 390.

The current compensation circuit 340 may be one switch or switch transistor, but may be defined as a circuit group including the same.

The operation of a circuit in the current compensation circuit 340 may be controlled by a setting value of a data processing circuit (not shown) or a register (not shown) of the current supply circuit 300.

The data current cutoff switch 350 may be turned on or off in response to the operation of the current compensation circuit 340. For example, the data current cutoff switch 350 may be turned off during the turn-off period of all or some circuits of the current compensation circuit 340.

Figure 6:
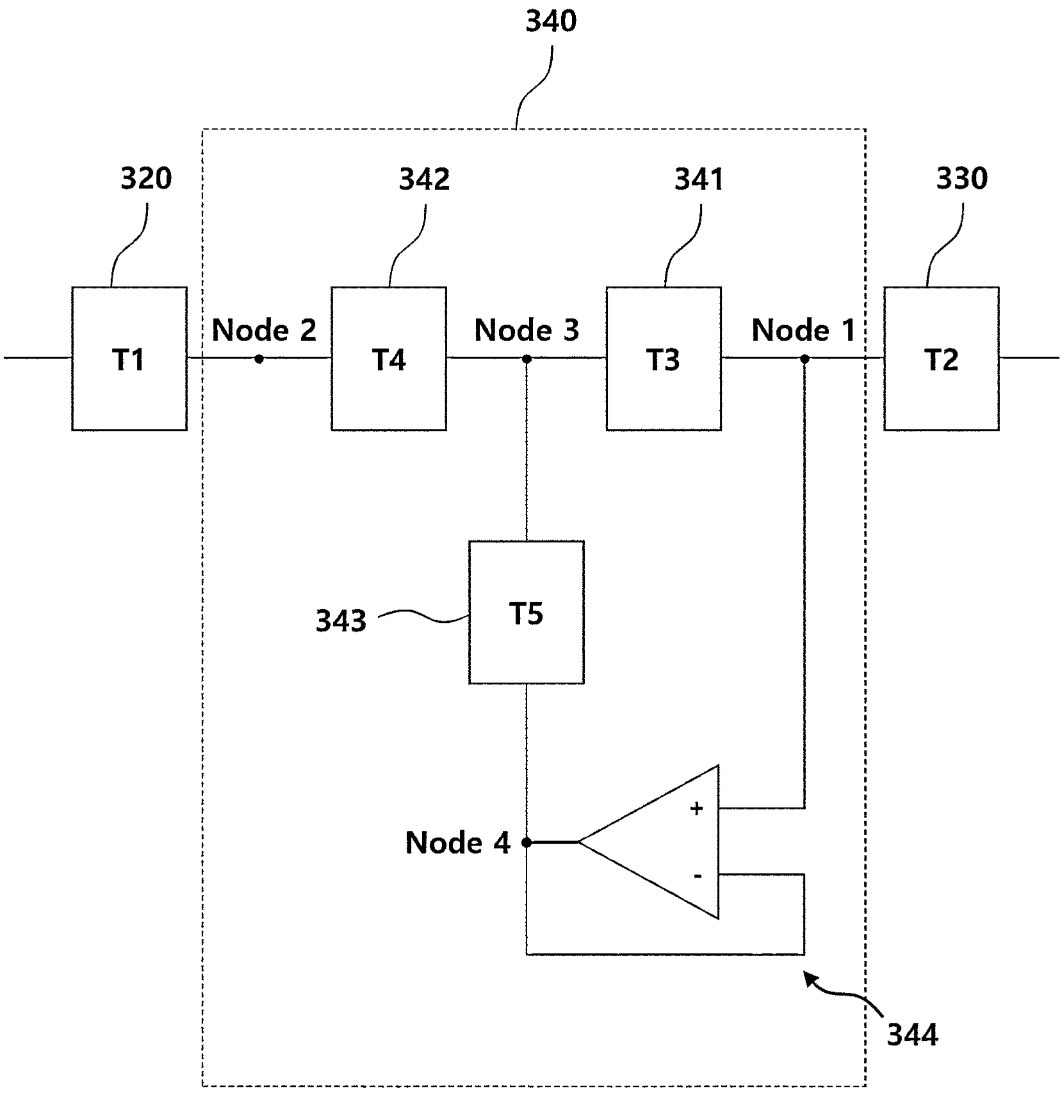
FIG. 6 is a third exemplary diagram illustrating a current supply circuit in accordance with an embodiment of the present disclosure.

FIG. 6 is a third exemplary diagram illustrating a current supply circuit in accordance with an embodiment of the present disclosure.

Referring to FIG. 6, an enlarged diagram of the current supply circuit 300 of FIG. 5 may explain the connection relationship of the first transistor 320, the second transistor 330, the current compensation circuit 340, a third transistor 341, a fourth transistor 342, a fifth transistor 343 and a buffer 344.

The current compensation circuit 340 may be connected to the first transistor 320 and the second transistor 330 to adjust a current transferred to the second transistor 330. One end of the second transistor 330 is connected to a capacitor (not shown), and a current transferred to the second transistor 330 may be changed by a leakage current occurring in the capacitor (not shown).

The current compensation circuit 340 may include one or more transistors to adjust the intensity, timing, etc. of a current flowing between the first transistor 320 and the second transistor 330.

For example, the current compensation circuit 340 may increase a current in order to compensate for a current decrease amount, for example, a current decrease by a voltage decrease due to the occurrence of a leakage current in the capacitor, or may decrease a current in order to compensate for a current increase amount, for example, a current increase by a voltage increase due to an external parasitic capacitor.

The current compensation circuit 340 may include a transistor group which is connected to one end, for example, the output node, of the first transistor 320 and one end, for example, the input node, of the second transistor 330.

The current compensation circuit 340 may include the third transistor 341, the fourth transistor 342, the fifth transistor 343 and the buffer 344.

The third transistor 341 and the fourth transistor 342 may be connected in series between the first transistor 320 and the second transistor 330, and each transistor, for example, a field effect transistor (MOSFET), may have a source terminal and a drain terminal which are connected in series.

One terminal of the second transistor 330 and one terminal of the third transistor 341 may be connected to form a first node (Node 1). The first node may be a common node of the second transistor 330 and the third transistor 341, and a positive (+) terminal of the input end of the buffer 344 may be connected to the first node.

One terminal of the first transistor 320 and one terminal of the fourth transistor 342 may be connected to form a second node (Node 2). The second node may be a common node of the first transistor 320 and the fourth transistor 342.

One terminal of the third transistor 341 and one terminal of the fourth transistor 342 may be connected to form a third node (Node 3). The third node may be a common node of the third transistor 341 and the fourth transistor 342, and a terminal of the fifth transistor 343 may be connected to the third node.

One terminal of the fifth transistor 343 may be connected to one terminal of the third transistor 341 and one terminal of the fourth transistor 342 to form the common third node.

One terminal of the fifth transistor 343 may be connected to the output end of the buffer 344 to form a fourth node (Node 4), and the fourth node may be connected to a negative (−) terminal of the input end of the buffer 344. The positive (+) terminal of the input end of the buffer 344 may be connected to the first node to transfer a voltage stored in the buffer 344 to the first node. The magnitude, timing, etc. of the voltage transferred to the first node may be determined according to the operations of the first to fifth transistors 320, 330, 341, 342 and 343 described above.

The buffer 344 and the fifth transistor 343 may be defined as being electrically connected in parallel with the first node and the third node, and may be connected in parallel to the third transistor 341 to be defined as a current compensation circuit being a circuit for compensating for a leakage current of the capacitor.

A gate terminal of the second transistor 330 may be connected to a source or drain terminal of the third transistor 341 to form the common first node. One terminals of the capacitor and the buffer 344 may be connected to the first node, and may decrease a variation in the voltage of the gate terminal of the second transistor 330.

A body terminal of the third transistor 341 may have the same voltage as the source terminal or the drain terminal, and may form a common node if necessary.

The names of the first to fifth transistors 320, 330, 341, 342 and 343 may be differently defined if necessary, and each transistor may be defined as a switch or a switch transistor.

The current compensation circuit 340 of FIG. 6 may be a block representation of the configuration of the current compensation circuit 340 of FIG. 5 described above.

Figure 7:
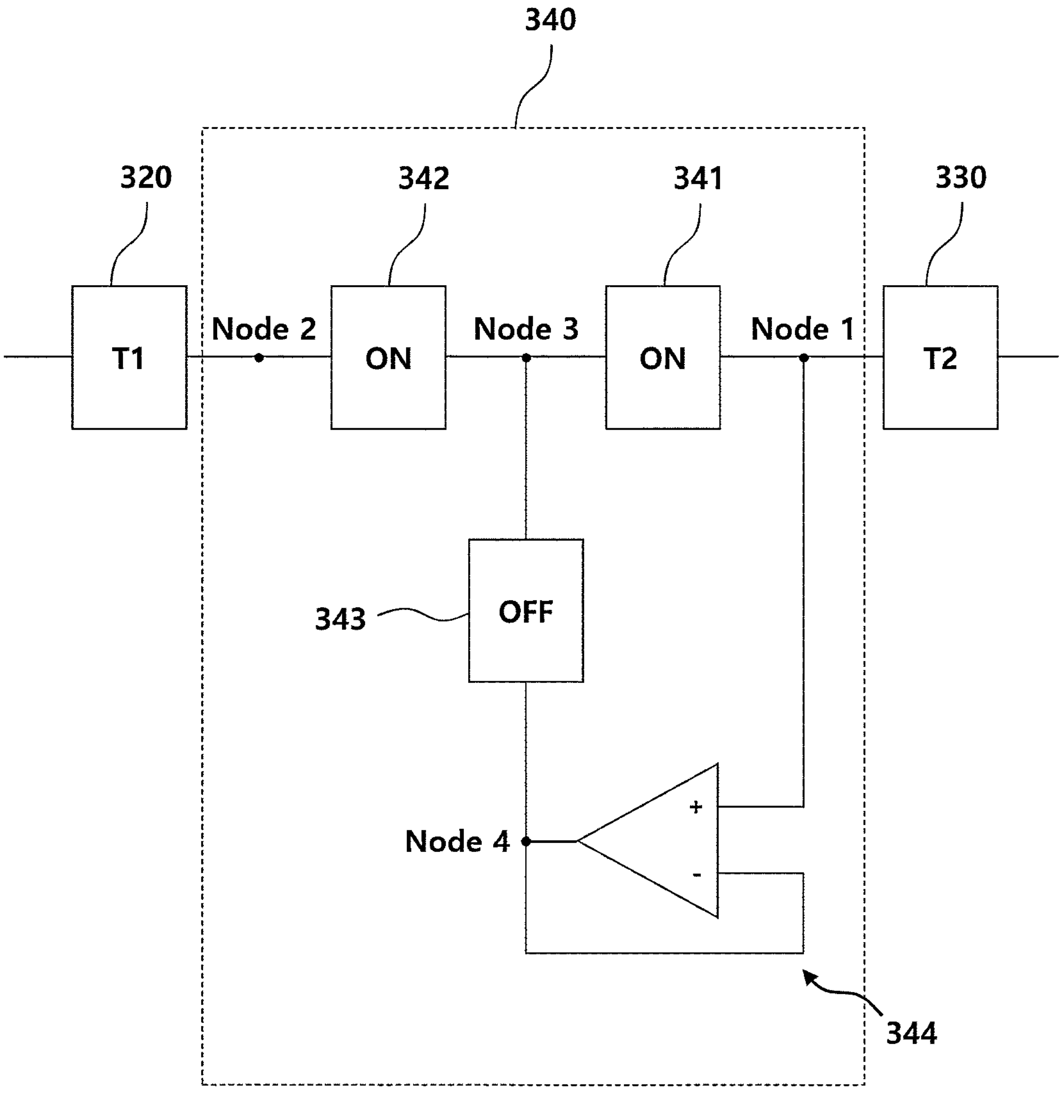
FIG. 7 is a diagram illustrating a switching operation of the current supply circuit in accordance with the embodiment of the present disclosure during a first time period.

FIG. 7 is a diagram illustrating a switching operation of the current supply circuit in accordance with the embodiment of the present disclosure during a first time period.

Figure 8:
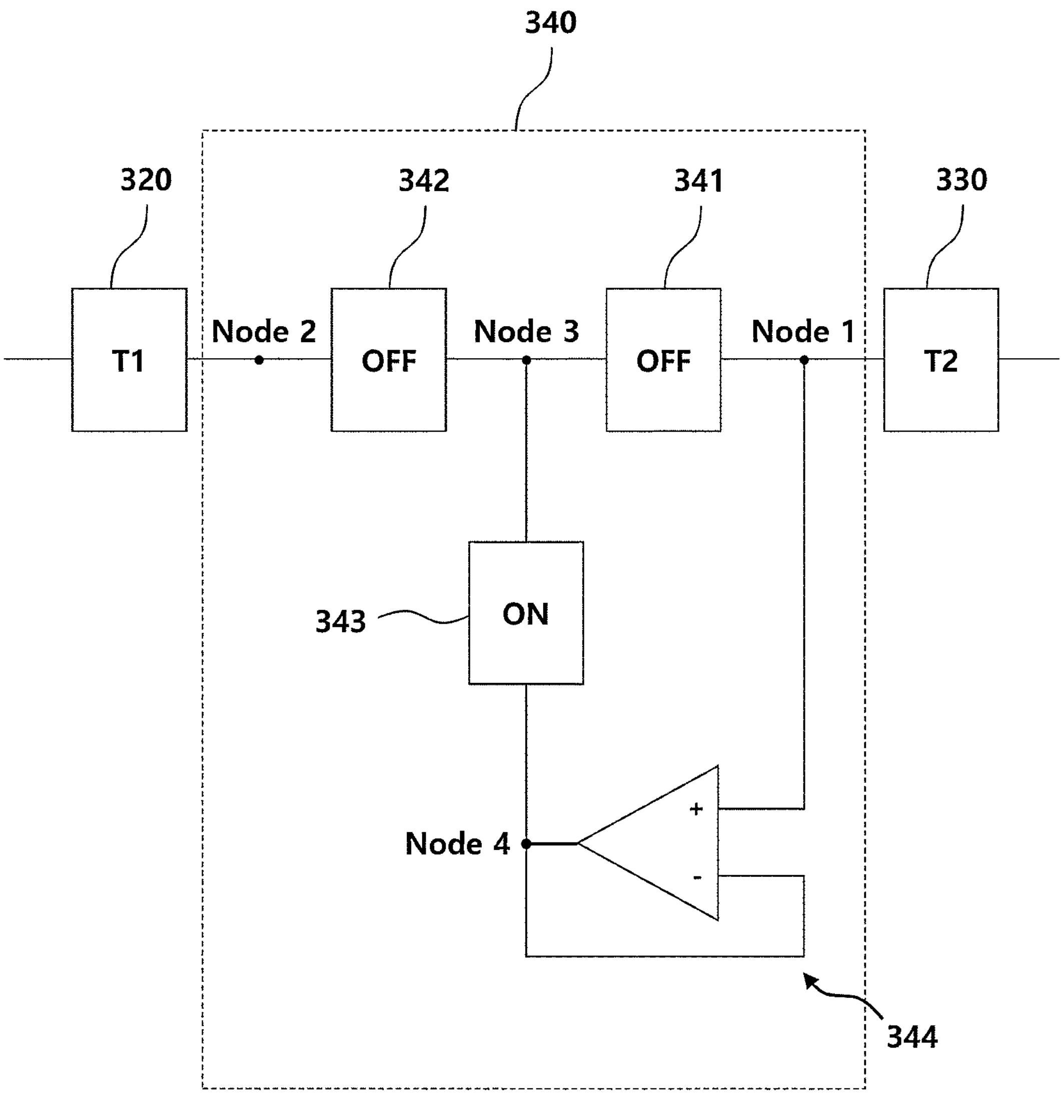
FIG. 8 is a diagram illustrating a switching operation of the current supply circuit in accordance with the embodiment of the present disclosure during a second time period.

FIG. 8 is a diagram illustrating a switching operation of the current supply circuit in accordance with the embodiment of the present disclosure during a second time period.

Referring to FIGS. 7 and 8, each circuit component of the current compensation circuit 340 may be independently driven.

For example, as illustrated in FIG. 7, when the third transistor 341 and the fourth transistor 342 are in a turn-on state, the fifth transistor 343 may be in a turn-off state, and this may be defined as switch driving during a first time period. The first time period may be a sampling operation state, but is not limited thereto.

For example, as illustrated in FIG. 8, when the third transistor 341 and the fourth transistor 342 are in a turn-off state, the fifth transistor 343 may be in a turn-on state, and this may be defined as switch driving during a second time period. The second time period may be a holding operation state, but is not limited thereto.

FIGS. 7 and 8 may illustrate an operation in which the current compensation circuit 340 is driven at timing of sampling and holding an analog signal in a data driving circuit (not shown), but are not limited thereto.

Figure 9:
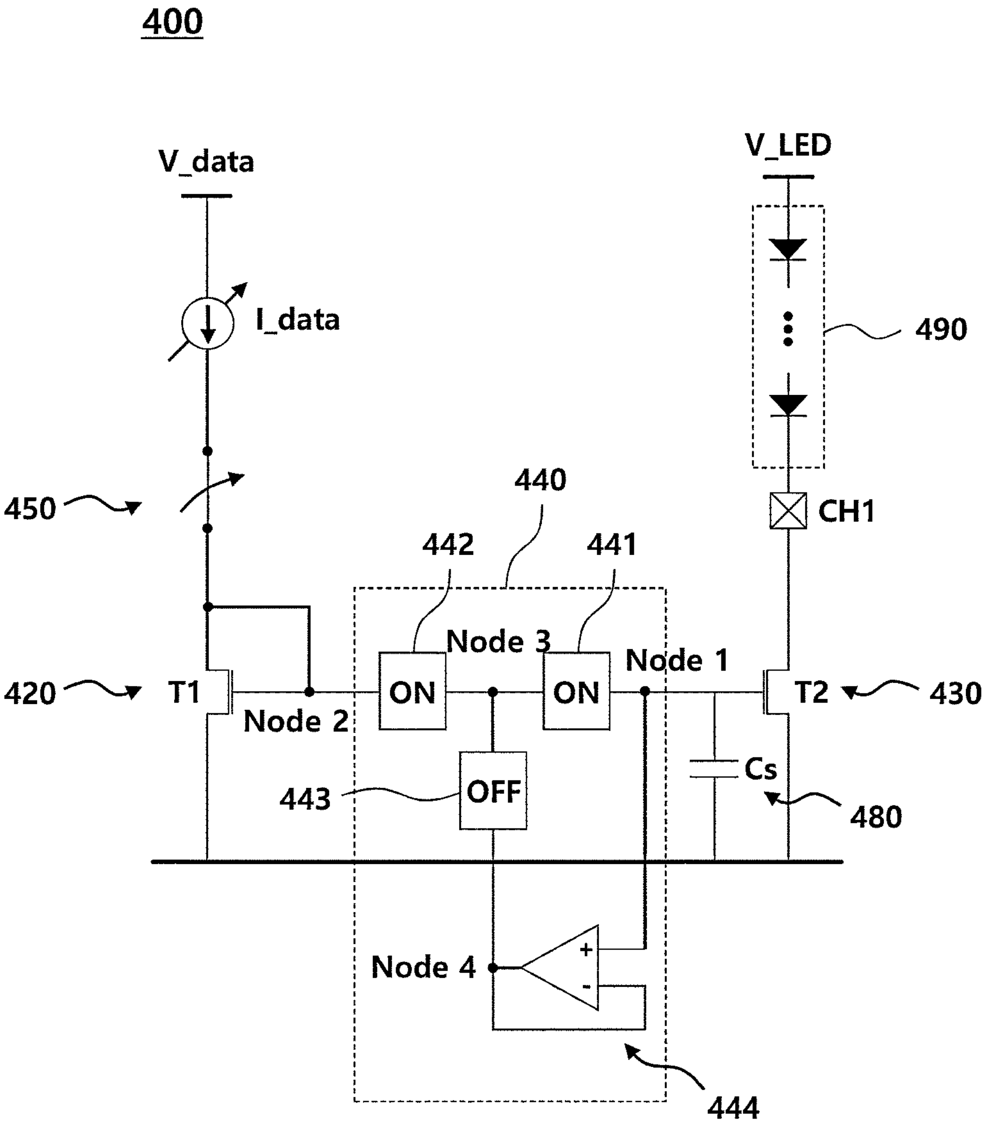
FIG. 9 is a diagram illustrating a switching operation of a current supply circuit in accordance with an embodiment of the present disclosure during a first time period.

FIG. 9 is a diagram illustrating a switching operation of a current supply circuit in accordance with an embodiment of the present disclosure during a first time period.

Referring to FIG. 9, a current supply circuit 400 may include a first transistor 420, a second transistor 430, a current compensation circuit 440, a data current cutoff switch 450, a capacitor 480, and so forth.

The first transistor 420 may be selectively supplied with a data driving current I_data through a data line.

The second transistor 430 may supply a current or voltage for driving a pixel to a light emitting diode 490 in response to the data driving current I_data of the first transistor 420.

The current compensation circuit 440 may be a circuit which is connected to the first transistor 420 and the second transistor 430 to adjust a current.

The current compensation circuit 440 may include a third transistor 441, a fourth transistor 442, a fifth transistor 443 and a buffer 444.

The current compensation circuit 440 may adjust the intensity, time interval, etc. of a current passing between one end, for example, a second node (Node 2), of the first transistor 420 and one end, for example, a first node (Node 1), of the second transistor 430, through one or more transistors.

The third transistor 441 of the current compensation circuit 440 may be disposed between the first transistor 420 and the second transistor 430.

The buffer 444 may be connected in parallel with the third transistor 441 to maintain the voltage of the third transistor 441, and the output end of the buffer 444 may be connected in series to the fifth transistor 443. In this case, the buffer 444 and the fifth transistor 443 may be defined as being connected in parallel to the third transistor 441.

The data current cutoff switch 450 may be disposed on the data line which is connected to the first transistor 420, and may cut off the data driving current I_data.

The data current cutoff switch 450 may change an operation in response to the operation timings of all or some circuits of the current compensation circuit 440.

The capacitor 480 may be connected to a gate terminal of the second transistor 430 to store the gate voltage of the second transistor 430. For example, without a limiting sense, the gate terminal of the second transistor 430 may be connected to one terminal of the capacitor 480 to have the same voltage, and another terminal, for example, a source or drain terminal, of the second transistor 430 may be supplied with the same voltage, for example, a ground voltage, as the other terminal of the capacitor 480.

The third transistor 441 may be a field effect transistor (MOSFET), and a body terminal and a source terminal thereof may be joined to prevent a leakage current.

Referring to FIG. 9, in the current supply circuit 400, the operations of the current compensation circuit 440 and the data current cutoff switch 450 may be determined during a first time period of a data driving circuit (not shown), but an arbitrary time period may be defined as a time period for the operation of each circuit.

During the first time period, the third transistor 441 and the fourth transistor 442 of the current compensation circuit 440 may maintain a turn-on state, and the fifth transistor 443 of the current compensation circuit 440 may maintain a turn-off state. In this case, the third transistor 441 and the fourth transistor 442 may be turned on or off at the same timing.

During the first time period, the data current cutoff switch 450 may maintain a turn-on state. In this case, the data current I_data may be transferred to the first transistor 420.

When a current is supplied through one terminal, for example, a second node, of the first transistor 420, the third transistor 441 and the fourth transistor 442 are in a turn-on state. Therefore, a current may be supplied to the second transistor 430 through the third transistor 441 and the fourth transistor 442.

When a current is supplied through one terminal, for example, the second node, of the first transistor 420, the fifth transistor 443 is in a turn-off state. Therefore, a current may not be supplied to the buffer 444 through the fifth transistor 443.

While the third to fifth transistors 441, 442 and 443 may individually operate, the operations of the third to fifth transistors 441, 442 and 443 may be controlled at the same timing.

As the operations of the current compensation circuit 440 and the data current cutoff switch 450 are simultaneously controlled, a voltage which is supplied to the light emitting diode 490 of a pixel by the second transistor 430 may be stably maintained, and the power consumption of the buffer 444 may be reduced. The operations of the current compensation circuit 440 and the data current cutoff switch 450 may be controlled at the same timing, for example, an arbitrary time period such as the first time period or a second time period.

According to the disposition of the third transistor 441, the fourth transistor 442, the fifth transistor 443 and the buffer 444 in the current compensation circuit 440, a voltage variation by a leakage current occurring at one end of the second transistor 430 or the capacitor 480 may be effectively prevented.

Figure 10:
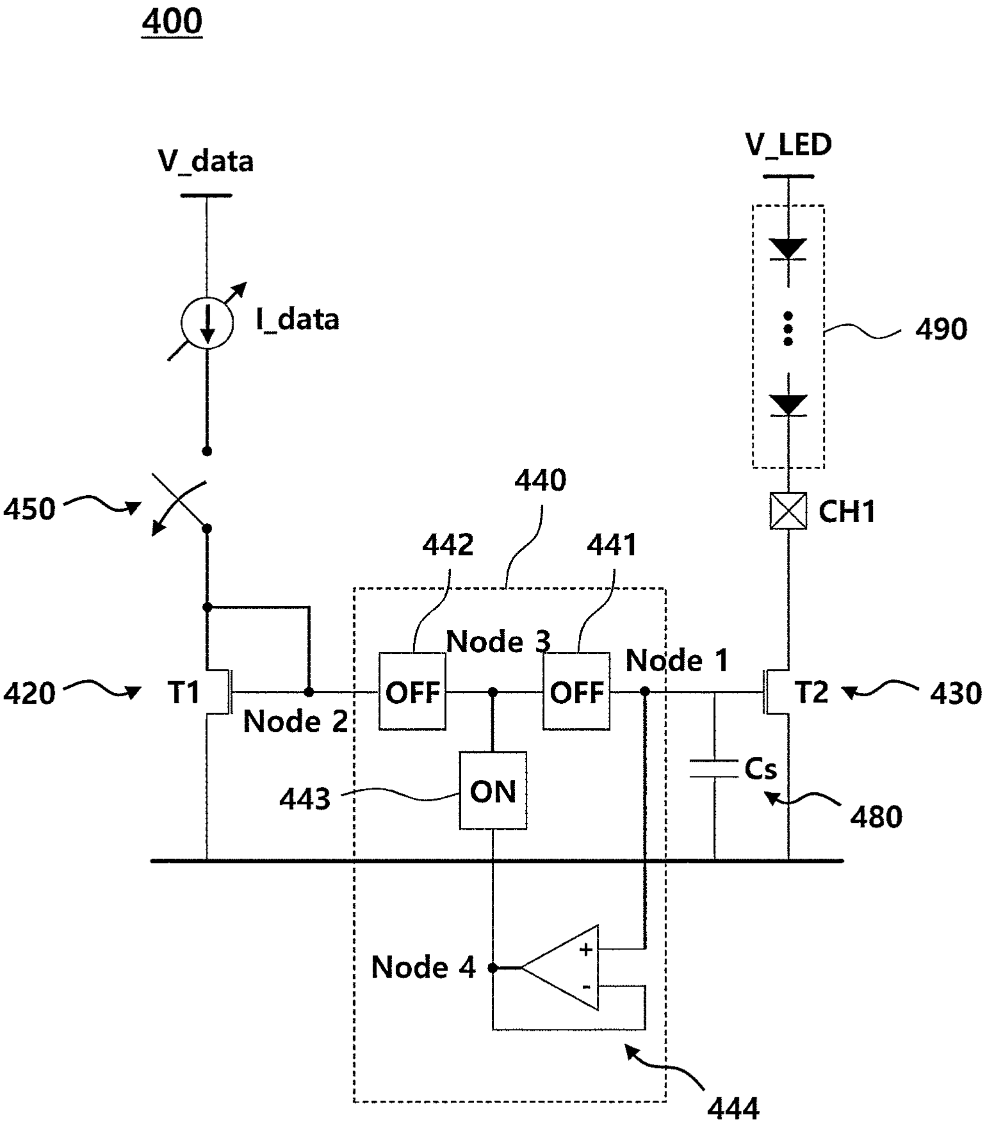
FIG. 10 is a diagram illustrating a switching operation of the current supply circuit in accordance with the embodiment of the present disclosure during a second time period.

FIG. 10 is a diagram illustrating a switching operation of the current supply circuit in accordance with the embodiment of the present disclosure during a second time period.

Referring to FIG. 10, the current supply circuit 400 may determine the operations of the current compensation circuit 440 and the data current cutoff switch 450 during a second time period of the data driving circuit (not shown).

During the second time period, the third transistor 441 and the fourth transistor 442 of the current compensation circuit 440 may maintain a turn-off state during a hold period, and the fifth transistor 443 of the current compensation circuit 440 may maintain a turn-on state. In this case, the third transistor 441 and the fourth transistor 442 may be turned on or off at the same timing.

During the second time period, the data current cutoff switch 450 may maintain a turn-off state. In this case, the data current I_data transferred to the first transistor 420 may be cut off.

When the operations of the current compensation circuit 440 and the data current cutoff switch 450 are simultaneously controlled, the first transistor 420 and the second transistor 430 may be electrically isolated, and at the same time, noise by a leakage current may be reduced.

Since the data current cutoff switch 450 cuts off the data current I_data in a turn-off state, power consumption by the data current I_data continuously supplied to the first transistor 420 regardless of the state of the second transistor 430 may be reduced.

Moreover, since the third transistor 441 and the fourth transistor 442 of the current compensation circuit 440 cut off, in a turn-off state, the current flow between the first transistor 420 and the second transistor 430, the first transistor 420 and the second transistor 430 may be electrically isolated till a next sampling period.

For example, when the first transistor 420 and the second transistor 430 configure a current mirror circuit, a mirror current changes together in response to a change in an input current, but each transistor may be maintained in an electrically independent state by the third transistor 441 and the fourth transistor 442.

The fifth transistor 443 of the current compensation circuit 440 may electrically connect, in a turn-on state thereof, a third node and a fourth node. In this case, the buffer 444 may maintain the voltage of the fourth node and the voltage of the first node to be the same, and thereby, may stably maintain the voltage of the first node even though the third transistor 441 and the fourth transistor 442 are in a turn-off state.

The buffer 444 may be connected in parallel to the terminals of the third transistor 441 to compensate for a leakage current of the capacitor 480 and compensate the voltage of the gate terminal of the second transistor 430.

Accordingly, since the current supply circuit 400 in accordance with the embodiment of the present disclosure may prevent a voltage variation of the capacitor 480 by compensating for a current leakage, it is possible to supply a constant current to the light emitting diode 490. In consideration of such characteristics of the current supply circuit 400, the current compensation circuit 440 may be defined as a voltage compensation circuit or the like.

The operations of the transistors 441, 442 and 443 of FIGS. 9 and 10 may correspond to the operation timing of the data current cutoff switch 450.

For example, when the data current cutoff switch 450 is turned on, the third transistor 441 and the fourth transistor 442 may be turned on, and the fifth transistor 443 may be turned off.

For example, when the data current cutoff switch 450 is turned off, the third transistor 441 and the fourth transistor 442 may be turned off, and the fifth transistor 443 may be turned on.

The operations of the transistors 441, 442, 443 and the data current cutoff switch 450 of FIGS. 9 and 10 are not limited to the operations performed during the sampling and holding periods of the data driving circuit (not shown), and the same functions may be realized during an arbitrary time period.

A terminal of each transistor may be defined as an input terminal or an output terminal according to an input/output direction of a current or a voltage, and a node connected to each terminal may be defined as an input node or an output node.

Figure 11:
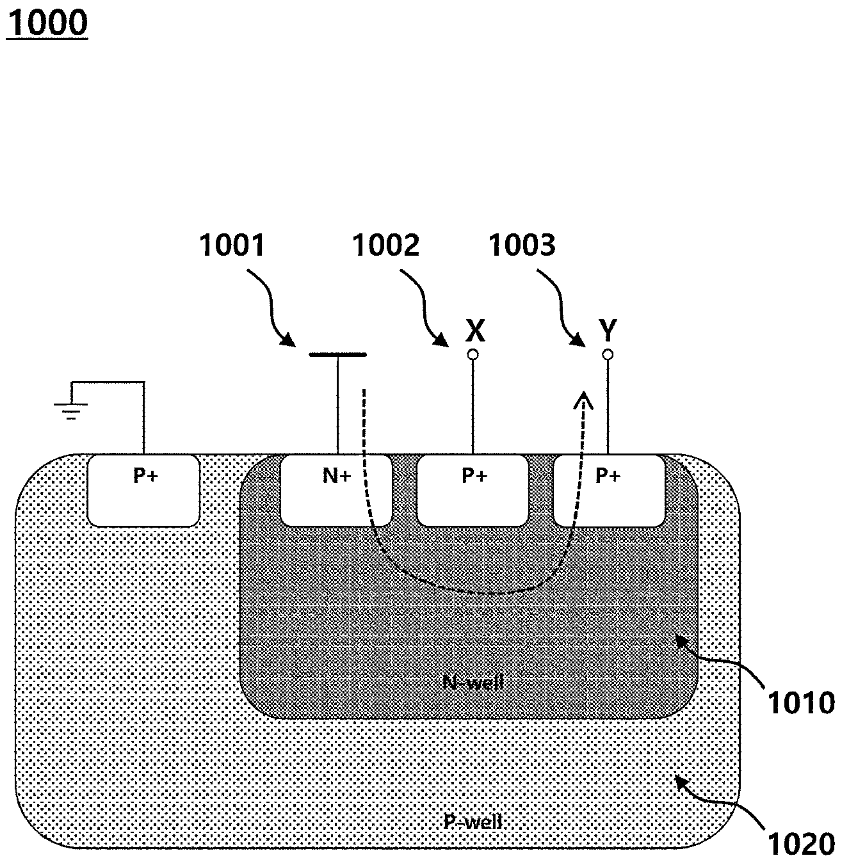
FIG. 11 is a diagram for explaining a current leakage process of a transistor.

FIG. 11 is a diagram for explaining a current leakage process of a transistor.

Referring to FIG. 11, a switch transistor 1000 may be a field effect transistor including an N-well 1010, a P-well 1020, and so forth.

The N-well 1010 may include a body terminal (an N+ terminal) 1001, a first terminal 1002 and a second terminal 1003. The first terminal 1002 and the second terminal 1003 may be a source terminal and a drain terminal, and the order thereof may be arbitrarily defined.

As illustrated in FIG. 11, in the conventional art, since the respective terminals of the switch transistor 1000 are maintained in an undistinguished state, a current may leak from the body terminal 1001 to the first terminal 1002 or the second terminal 1003. In this case, as a current leaks from the body terminal 1001 to the second terminal 1003, the brightness of a pixel may change due to the charge transferred to a capacitor.

For example, the switch transistor 1000 may be the third transistor 441 of FIG. 9 described above, the first terminal 1002 may be a terminal which is connected to the third node, and the second terminal 1003 may be a terminal which is connected to the first node.

If a current transferred to the first terminal 1002 is cut off by a switch (not shown) connected to the first terminal 1002, a current transferred to the second terminal 1003 increases, and thus, an amount of leakage current may further increase.

In this case, by a leakage current occurring in the body terminal 1001 of a high voltage, a voltage (Vx) of the first terminal 1002, for example, a voltage at a point X, and a voltage (Vy) of the second terminal 1003, for example, a voltage at a point Y, become different.

A parasitic diode which is formed between the body terminal 1001 and the second terminal 1003 may be not a physically formed parasitic diode but a conceptually formed parasitic diode.

A P+ terminal of a P-well 1020 may have a ground voltage.

Figure 12:
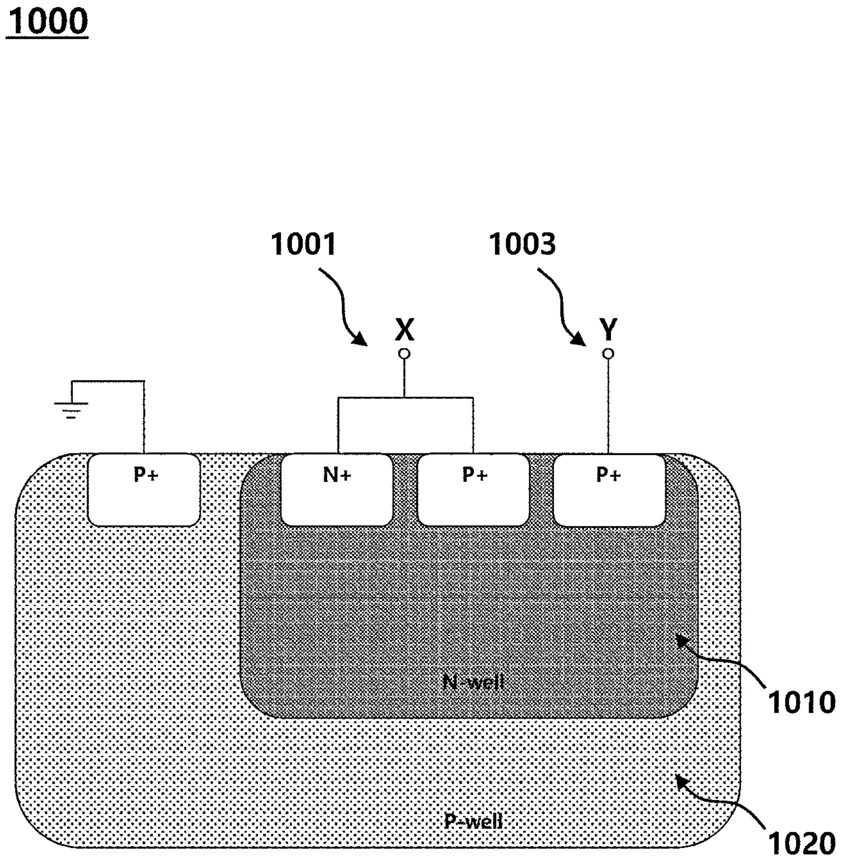
FIG. 12 is a diagram for explaining a method for preventing current leakage of a transistor in accordance with an embodiment of the present disclosure.

FIG. 12 is a diagram for explaining a method for preventing current leakage of a transistor in accordance with an embodiment of the present disclosure.

As illustrated in FIG. 12, when the body terminal 1001 and the first terminal 1002 are maintained at the same voltage, a current leakage may be prevented.

The voltage of the body terminal 1001 may be maintained the same as the voltage (Vx) of the first terminal 1002, for example, the voltage at the point X, and the voltage (Vy) of the second terminal 1003, for example, the voltage at the point Y, may also be maintained the same as the voltage (Vx) of the first terminal 1002.

The turn-on and turn-off of the first switch transistor 441 of FIGS. 9 and 10 described above may indicate a change in the states of FIGS. 11 and 12 described above. In this case, the third node of the first switch transistor 441 may be the first terminal 1002, the first node of the first switch transistor 441 may be the second terminal 1003, and the first terminal 1002 and the second terminal 1003 may maintain the same voltage by the buffer 444.

The body terminal 1001 and the first terminal 1002 may be joined by a signal line or form a common node to maintain the same voltage, but are not limited thereto.

The voltage state of each terminal of the switch transistor 1000 may be changed for each time period according to the operation of an internal circuit. By a combination of the operations of one or more switches or switch transistors described above, a leakage current may be prevented, and at the same time, power consumption in a display device may be reduced.

The transistor 1000 of FIGS. 11 and 12 may be the third transistor 441 of FIGS. 9 and 10, but is not limited thereto.

What is claimed is:

1. A current mirror circuit comprising:

a first transistor configured to be supplied with a data current from a data driving circuit;

a second transistor configured to drive a light emitting diode by mirroring the data current transferred to the first transistor;

a capacitor disposed between the first transistor and the second transistor and configured to store a voltage of a gate terminal of the second transistor; and a first switch disposed between the first transistor and the second transistor and configured to adjust an input current of the gate terminal of the second transistor, wherein the first switch comprises:

a third transistor disposed between the first transistor and the second transistor, and a fourth transistor connected to a common node, to which a terminal of the first transistor and an output node of a second switch are connected, and an input node of the third transistor, and the third transistor and the fourth transistor are configured to operate at the same timing.

2. The current mirror circuit according to claim 1, wherein the same voltage is supplied to one terminal of the first transistor and one terminal of the second transistor.

3. The current mirror circuit according to claim 1, wherein the second switch is disposed between the data driving circuit and the first transistor, and the second switch is configured to be turned off during a turn-off period of the first switch or is configured to be turned on during a turn-on period of the first switch.

4. The current mirror circuit according to claim 3, wherein the voltage charged in the capacitor is adjusted by operations of the first switch and the second switch.

5. The current mirror circuit according to claim 3, wherein the first switch further comprises:

a buffer connected in parallel with terminals of the third transistor and configured to compensate for a leakage current of the capacitor.

6. The current mirror circuit according to claim 5, wherein a body terminal of the third transistor forms a common node with a source terminal or a drain terminal.

7. The current mirror circuit according to claim 5, wherein the first switch further comprises:

a fifth transistor connected to a common node which is formed by the input node of the third transistor and an output node of the fourth transistor.

8. A current supply circuit comprising:

a first transistor configured to be supplied with a data driving current through a data line;

a second transistor configured to supply a pixel current to a light emitting diode in response to the data driving current of the first transistor; and a current compensation circuit connected to the first transistor and the second transistor and configured to adjust a current transferred to the second transistor, wherein the current compensation circuit is configured to adjust a current flowing between the first transistor and the second transistor through at least one switch transistor, the current compensation circuit comprises:

a third transistor disposed between the first transistor and the second transistor and connected to a gate terminal of the second transistor, and a fourth transistor disposed between the first transistor and the third transistor, and the third and fourth transistors are configured to be turned on and/or off at the same timing.

9. The current supply circuit according to claim 8, wherein the data line connected to the first transistor comprises a data current cutoff switch which is configured to cut off the data driving current.

10. The current supply circuit according to claim 8, wherein the second transistor forms a common node with a capacitor which stores a voltage of the gate terminal therein.

11. The current supply circuit according to claim 10, wherein the current compensation circuit further comprises:

a buffer connected in parallel with respective terminals of the third transistor and configured to maintain a voltage of the third transistor.

12. The current supply circuit according to claim 11, wherein the third transistor is a field effect transistor (MOSFET) in which a body terminal and a source terminal are connected.

13. The current supply circuit according to claim 11, wherein the current compensation circuit further comprises a fifth transistor connected to a common node of the third transistor and the fourth transistor, and one end of the fifth transistor and an output terminal of the buffer are configured to form a common node.

14. The current supply circuit according to claim 13, wherein the fifth transistor is configured to be maintained in a turn-off state when the third transistor and the fourth transistor are in a turn on state, and the fifth transistor is configured to be maintained in a turn-on state when the third transistor and the fourth transistor are in a turn-off state.

15. The current supply circuit according to claim 14, wherein operation timings of the third to fifth transistors corresponds to an operation timing of a data current cutoff switch which is connected to one end of the first transistor.

16. A current supply circuit comprising:

a first transistor selectively supplied with a data driving current by using a data current cutoff switch through a data line;

a second transistor configured to supply a current, having a magnitude corresponding to that of the data driving current transferred to the first transistor, to a light emitting diode; and a voltage compensation circuit connected to one end of the first transistor and one end of the second transistor and configured to compensate for a voltage of a gate terminal of the second transistor, wherein an operation of the voltage compensation circuit is changed according to an operating timing of the data current cutoff switch.

17. The current supply circuit according to claim 16, further comprising:

a third transistor and a fourth transistor connected to gate terminals of the first transistor and the second transistor, wherein, when the data current cutoff switch is turned off, the third transistor and the fourth transistor electrically isolate the first transistor and the second transistor by stopping current supply.

18. The current supply circuit according to claim 17, further comprising:

a fifth transistor connected to a common node which is formed by the third transistor and the fourth transistor; and a buffer having an input terminal which is connected to a common node between the second transistor and the third transistor and an output terminal which is connected to a node of one end of the fifth transistor so as to maintain a gate voltage of the second transistor to be constant.

19. The current supply circuit according to claim 18, wherein operation timings of the third to fifth transistors corresponds to an operation timing of the data current cutoff switch, and when the data current cutoff switch is turned on, the third transistor and the fourth transistor are turned on and the fifth transistor is turned off or when the data current cutoff switch is turned off, the third transistor and the fourth transistor are turned off and the fifth transistor is turned on.

* * * * *